United States Patent [19]

Spratt

[11] 4,021,808

[45] May 3, 1977

[54] REAL TIME THRESHOLD

[75] Inventor: Brendan J. Spratt, Boca Raton, Fla.

[73] Assignee: The Bendix Corporation, Southfield, Mich.

[22] Filed: Oct. 30, 1975

[21] Appl. No.: 627,160

[52] U.S. Cl. .................... 343/113 R; 343/106 R; 325/322
[51] Int. Cl.² ........................................ G01S 5/02
[58] Field of Search ...... 343/108 M, 106 R, 113 R; 325/322, 323; 235/150.26

[56] References Cited
UNITED STATES PATENTS

| | | |
|---|---|---|
| 3,202,994 | 8/1965 | Fombonne .................... 343/108 M |
| 3,671,866 | 6/1972 | Rutherford et al. ............... 325/322 |
| 3,818,478 | 6/1974 | Groginsky .................... 343/108 M |

*Primary Examiner*—Maynard R. Wilbur
*Assistant Examiner*—T. M. Blum
*Attorney, Agent, or Firm*—W. G. Christoforo; Bruce L. Lamb

[57] ABSTRACT

A beam scanning through a receiver is detected at the receiver deriving a threshold level from the peak of the received beam, the threshold being used to detect the received beam envelope as delayed by an analog delay circuit.

5 Claims, 9 Drawing Figures

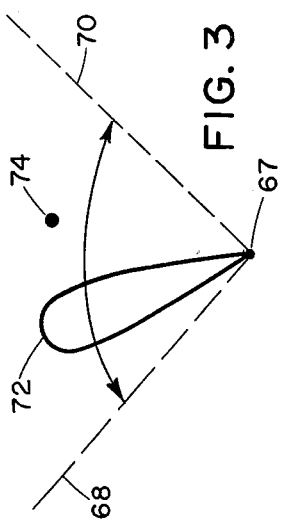
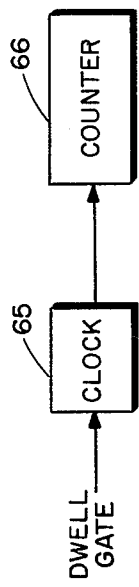
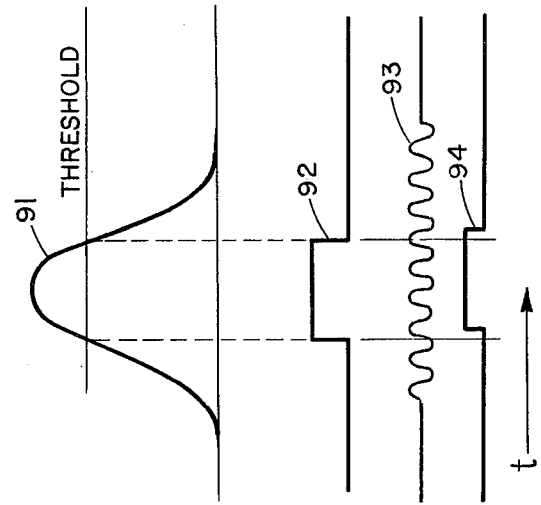
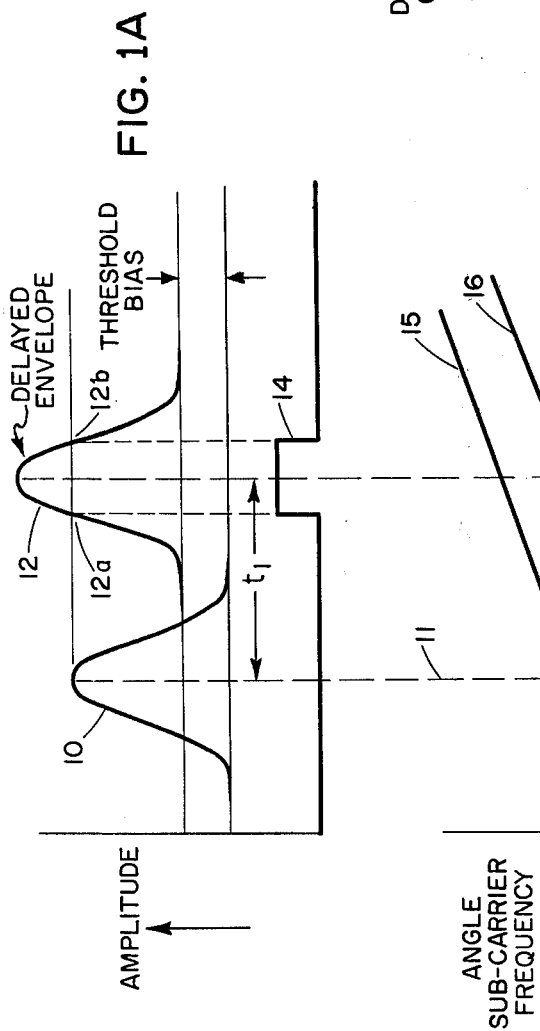
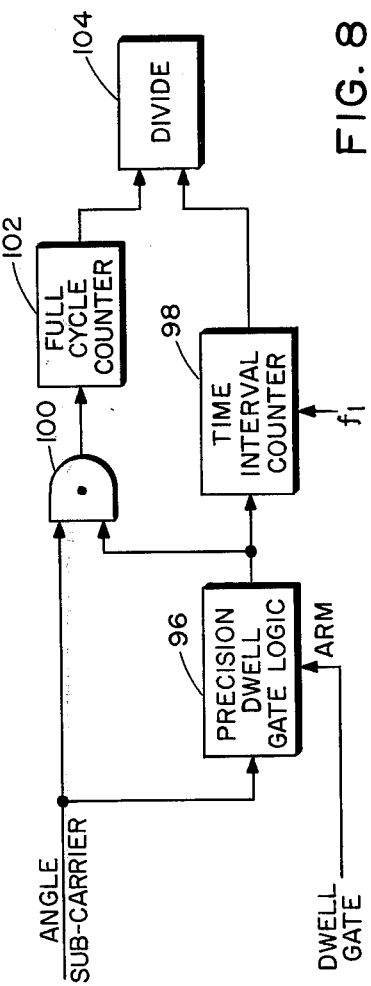

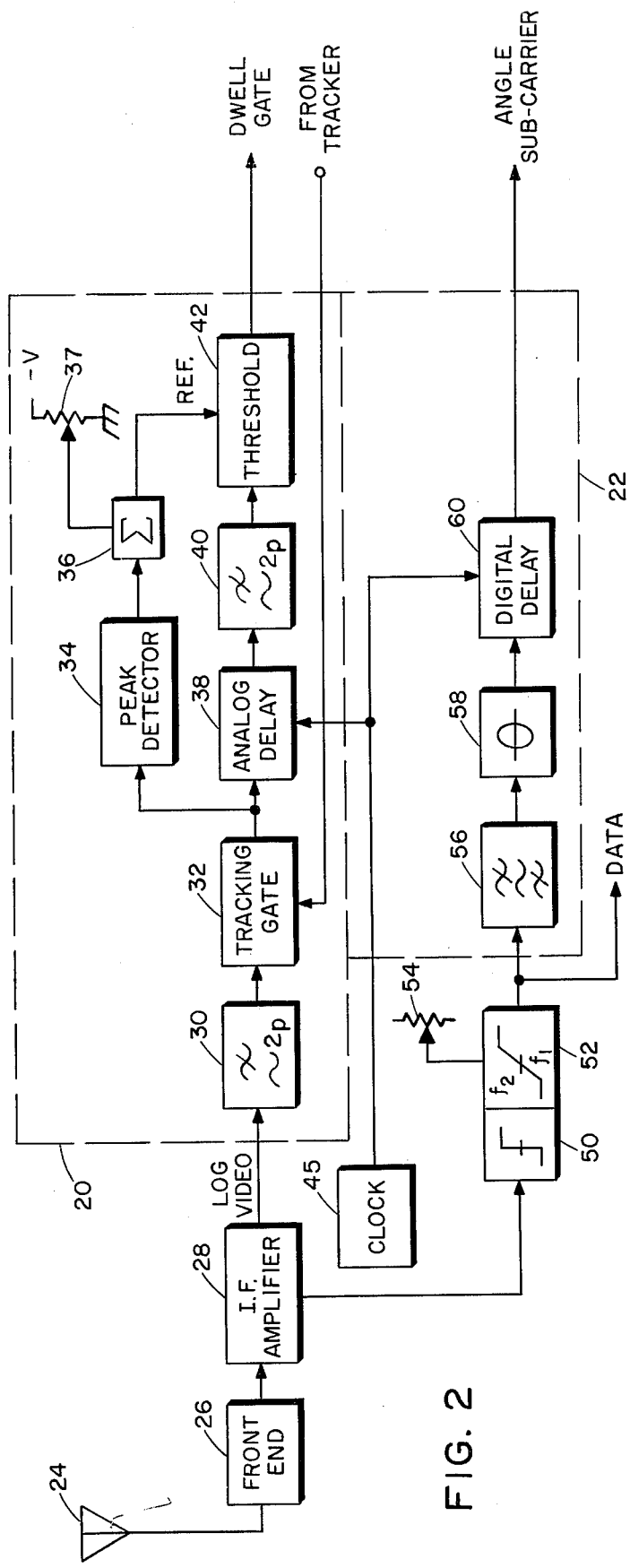
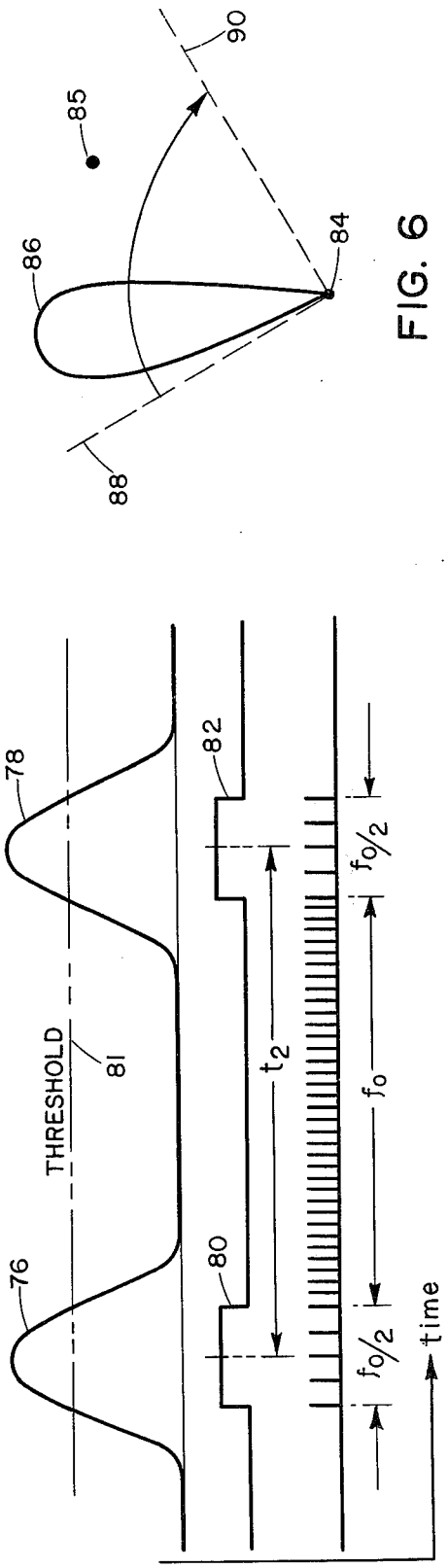
FIG. 2
FIG. 4
FIG. 6

REAL TIME THRESHOLD

BACKGROUND OF THE INVENTION

This invention relates to means for detecting occurrence of signals and more particularly relates to threshold means for providing a time measure of the leading and trailing edges of a radiated signal incident at a receiver.

In various fields, such as radio navigation, threshold circuits are required to exclude extraneous signals from consideration and also to provide an indication of when a signal can be considered to start and stop. For example, in a microwave landing system for aircraft it is proposed to disseminate angular information, such as azimuth or elevation information, correlated to the location of a receiving aircraft with respect to a station at the air field by radiating a scanning beam from the station through a section of space from a known starting position to a known end position, and return at a known or constant rate. In this case, the time between subsequent passages of the beam at a receiving aircraft will be a measure of the azimuth or elevation, as appropriate, of the aircraft. This scheme is herein termed the time reference scheme. As an alternative, it is proposed to scan a beamed signal of predetermined frequency into space from a starting position to an end position. Encoded on the beam by frequency modulation is an angle sub-carrier whose frequency varies with beam pointing angle. In this case the mean frequency of the sub-carrier while the beam is incident on a point in space is a measure of the angular position of the receiver. This alternative scheme is herein termed the frequency reference scheme. In either case, it is necessary to accurately threshold the beam signal. Threshold circuits are used to determine when a signal occurs. Where only moderate accuracy is required, prefixed thresholds are satisfactory. Where greater accuracy is desired, storage circuits are provided which permit thresholding of a second occurring signal with a voltage derived and stored from the amplitude of a previously received signal. However, rapid signal fading, particularly that experienced close to the threshold, may cause amplitude changes in the detected signal envelope over the time period between consecutive signals and of a magnitude sufficient to cause loss of data. Such fades are normally caused by a combination of vertical and lateral signal multipath and are particularly noticeable when the receiver is moving rapidly.

BRIEF SUMMARY OF THE INVENTION

The present invention solves the thresholding problem caused by rapid signal fading by developing in essentially real time a threshold voltage from the received signal to be detected. This is accomplished in the receiver by delaying the received signal on route to the threshold circuit for a time sufficient to allow determination of the signal peak amplitude and for the generation of a proper threshold voltage therefrom. The signal envelope is delayed by passing it through an analog shift register of the bucket brigade type and subsequently dumping the signal into an output amplifier. At the same time, the peak amplitude of the undelayed signal envelope is determined and the threshold for the delayed signal set in accordance therewith.

It is thus an object of this invention to provide an essentially real time threshold circuit.

It is another object of this invention to provide a threshold circuit which generally eliminates the deleterious affects of rapid signal fading.

BRIEF DESCRIPTION OF THE DRAWINGS

FIG. 1A illustrates wave forms of signals occurring at various points in the circuits of the invention.

FIG. 1B illustrates how the angle sub-carrier is delayed when practicing the invention in accordance with a scheme for disseminating azimuth information by frequency reference principles.

FIG. 2 is a block diagram which shows how the invention can be used for deriving azimuth when azimuth information is disseminated by either a frequency or time reference scheme.

FIGS. 3, 4 and 5 are applicable particularly to schemes for disseminating information through a time reference scheme wherein FIG. 3 shows a station disseminating information, FIG. 4 explains how detected information is processed and FIG. 5 is a block diagram which shows preferred means for processing the detected information.

FIGS. 6, 7 and 8 are applicable particularly to schemes for disseminating information through a frequency reference scheme wherein FIG. 6 shows a station disseminating information, FIG. 7 is useful in explaining how detected information is processed and FIG. 8 is a block diagram which shows preferred means for processing the detected information.

DESCRIPTION OF THE PREFERRED EMBODIMENT

Refer first to FIG. 1A which illustrates idealized signal signatures of a radiated scanning beam as it sweeps past a receiver in space. This figure is helpful in explaining the operation of the present invention and is shown on a common time scale with FIG. 1B, more of which will be described below. In FIG. 1A, wave 10 is the envelope of the scanning beam incident on a receiver while wave 12 illustrates wave 10 as delayed by a small time $t_1$ and offset in amplitude by an amount termed threshold bias. Referring to FIG. 3, wave 10, for example, can be the envelope at a receiver 74 of a beam 72 radiated from station 67, as it scans past the receiver. It is desired by the present invention to threshold the received and delayed beam represented by envelope 12 (returning to FIG. 1A) with respect to the undelayed beam 10. This is affected by detecting a predetermined and preferably an easily recognized chracteristic of the undelayed envelope 10 and thresholding the delayed envelope against the detected characteristic. Preferably, the peak of envelope 10 is the characteristic detected and offset by the threshold bias to set the threshold, with envelope 12 passing through the threshold at points 12a and 12b, these points defining limits of a dwell gate 14, whose purpose will be described below.

Refer now to FIG. 2 which shows an embodiment of the invention comprised of a beam envelope detector 20 and a sub-carrier detector 22, both of which detectors are preferably used to detect a frequency reference scanning beam since it is necessary in that scheme when delaying the beam envelope in detector 20 to also delay the sub-carrier, for example, by detector 22, to maintain the predetermined relationship between the beam envelope and the sub-carrier. When detecting time reference scanning beams, however, detector 22 can be eliminated since there is no sub-carrier present such as that used with the frequency reference scanning beams. For this reason, the detector 20 and its operation will be explained now and detector 22 and its operation explained later.

A receiver situated in space and having incident thereover a scanning beam of the type described includes standard elements such as antenna 24, front end circuits 26 and an IF amplifier 28 whose outputs include a log video signal comprised of the beam envelope and which is applied to detector 20, and the demodulated sub-carrier (if applicable) which is applied to detector 22. It should be understood that information other than angular data, such as beam identification data, can be modulated on a beam sub-carrier and comprise an output from IF amplifier 28. Means for processing this other information do not comprise a portion of the present invention and, for clarity, are not shown.

Detector 20 is comprised of a two-pole low pass filter 30 through which log video signals from amplifier 28 are passed through tracking gate 32 to a peak detector 34 and also to an analog delay circuit 38. Tracking gate 32 can be of a type known to those skilled in the art which in a tracking mode is opened only during the time a valid beam envelope such as envelope 10 of FIG. 1A, is expected to be received at the receiver, and is closed at other times so as to exclude extraneous signals. As known to those skilled in the art, the purpose of the tracking gate is to prevent the processing of out-of-beam extraneous signals such as out-of-beam multipath signals. Peak detector 34 can be any of the type known to those skilled in the art and which detects and holds the peak beam envelope. A signal having a level related to the peak of the beam envelope is summed in summer 36 with the threshold bias derived from a level set 37. Where the signal being processed is a logarithmic signal the level set can be such as to reduce the peak detector output by a fixed voltage which corresponds to a fixed number of db's. In equipment actually built, the level set adjustment was set at −4db so that the scanning beam threshold circuit 42 was automatically adjusted to threshold the scanning beam at its −4 db points as will become clear as the description proceeds.

The beam envelope passing through tracking gate 32 is also applied to an analog delay 38 which is preferably an analog shift register of the bucket brigade type such as that available from International Telephone & Telegraph and having their Part No. TCA350. This type of analog delay device, which was used in an actual embodiment of the invention, consists of 185 MOS FET stages on a single semiconductor chip. The device operates, in digital shift register fashion in response to clock pulses applied thereto from a clock 45 for transporting charges from stage to stage of a serially connected array of MOS storage bins and finally dumping the charges consecutively into an output amplifier. In essence, the bucket brigade can act as an analog delay circuit of low distortion and high signal to noise ratio.

The delayed beam envelope corresponding to envelope 12 in FIG. 1A issuing from delay circuit 38 is applied through a second two-pole low pass filter to a threshold circuit 42. The second low pass filter, in combination with filter 30 results in an overall four-pole Butterworth filter response characteristic. Sampling noise, introduced by the clock pulses at delay circuit 38, is removed by the second filter. The delayed beam envelope is now thresholded against the undelayed beam envelope peak as reduced by level set 37 and summer 36. The output signal from threshold 42 comprises the aforementioned dwell gate.

Referring now to FIG. 1B, where a frequency reference scheme is used to modulate the scanning beam, the sub-carrier represented by curve 15, is seen to increase in frequency as the beam sweeps past the receiver, the frequency of the sub-carrier at the center of envelope 10 being a measure of the beam pointing angle and hence the angular position of the receiver. It is necessary to process the received signal properly so that the sub-carrier be delayed by the same amount $t_1$ as the beam envelope is delayed so that the delayed sub-carrier, represented by curve 16, bears the same relationship to the delayed envelope 12 as the undelayed sub-carrier does to the undelayed envelope. This is accomplished through the use of detector 22 of FIG. 2 which will now be described. The beam carrier is equalized in IF amplifier 28, limited in circuit 50 and then demodulated in a wide band discriminator 52. The output of discriminator 52 is deemphasized to provide a flat output to the phase modulated sub-carrier signals carried on the carrier frequency. The discriminator output is also gated by a noise quieting squelch circuit set by potentiometer 54 to operate just below the improvement threshold. Following demodulation, the sub-carrier is separated into two channels, one to be passed to a decoding circuit wherein date normally included whether a frequency reference or time reference scheme is employed is extracted. The data decoding circuit is not shown as part of this invention. The other channel, that provided for the angle coded sub-carrier, is comprised of detector 22 which includes a band pass filter 56 designed to have a characteristically small excursion. The filtered sub-carrier is then zero detected by circuit 58 and delayed in delay circuit 60 which is suitably a digital type operating in accordance with the pulses from clock 45 so as to be synchronized with the analog delay circuit 38 of detector 20. The output from delay circuit 60 comprises the zero crossings of the angle coded sub-carrier delayed and by an identical amount as the beam envelope.

Referring now to FIGS. 3, 4 and 5, and particularly to FIG. 3, it will be explained how a receiver 74 within a field of interest determines its angular position with respect to a known station 67 from which a scanning beam 72 is radiated and scanned from a predetermined direction or position 68 at a constant speed to a predetermined direction or position 70 and return. The scan of beam 72 from position 68 to position 70 and return comprises one cycle of operation. It can be seen that during one cycle receiver 74 will be illuminated by the beam twice, with the time period between consecutive scans being an angular measure of the location of the receiver with respect to station 67.

Refer now to FIG. 4 where there are seen beam envelopes 76 and 78 which comprise a time representation of the beam detected at receiver 74 as it scans the receiver in the to and from directions. A threshold level is represented by line 81 and is preferably set a predetermined number of db's below the peak amplitude of the beam envelope by a detector such as detector 20 of FIG. 2. To calculate the angular location of receiver 74 it is merely necessary to determine the time $t_2$ between the centroids of the two dwell gates 80 and 82 derived from beam envelopes 76 and 78, respectively. This is simply accomplished by the device of FIG. 5, reference to which should also now be made, wherein the dwell gate signal is applied to a second clock 65, whose output during the period of the dwell gates comprises clock pulses at a known pulse repetition frequency of $f_0/2$ and whose output during the time between successive dwell gates comprises clock pulses at a known pulse repetition frequency of $f_0$, that is, twice the pulse repetition frequency as during the period the dwell gates. At all other times, the clock is effectively turned off. The clock pulses are applied to a counter 66, with the number of pulses being accummulated therein during one cycle of the system of FIG. 3 being a measure of the angular location of receiver 74 with respect to station 67.

Refer now to FIG. 6 where there is shown a station 84 radiating a scanning beam 86 having an angle encoded sub-carrier for disseminating angular position in accordance with a frequency reference dissemination scheme. It is assumed here that beam 86 is scanned at a uniform rate between known position 88 to known position 90 during which time the sub-carrier frequency is altered on a known schedule, preferably a uniform increase in sub-carrier frequency in accordance with azimuth pointing angle. The scanning beam, of course, is intercepted by receiver 85 at which receiver a beam envelope such as envelope 91 of FIG. 7, reference to which figure should now be made, is obtained. A threshold level is seen in FIG. 7, the threshold level being derived in a detector such as detector 20 of FIG. 2, it being assumed that envelope 91 is the delayed beam envelope. In response to the detected beam envelope dwell gate 92 is produced. There is also seen a sub-carrier frequency 93 shown at least in part within dwell gate 92. To obtain the angular location of receiver 85 of FIG. 6 it is now merely necessary to calculate the mean or average frequency of the sub-carrier during the interval of the dwell gate. This can be accomplished by counting the number of cycles of the sub-carrier occurring during the dwell gate and dividing by the period of the dwell gate. In the circuit to be described, this is accomplished by generating a precision dwell gate 94 whose limits are defined by the first positive-going zero crossing of the sub-carrier after the leading edge of dwell gate 92 and by the first negative-going zero crossing of the sub-carrier after the trailing edge of dwell gate 92. It is then assumed that the angular location of receiver 85 is equal to the number of zero crossings of the sub-carrier occurring during the interval of the precision dwell gate 94 divided by the period of the precision dwell gate. Of course, this simplification will cause a small error which in the environment of an MLS system is insignificant and thus ignored. Specific means for compensating or correcting for this error do not comprise a portion of this invention and hence are not explained.

Refer now to FIG. 8 which shows means for obtaining the average frequency of a sub-carrier incident upon a receiver within a field of interest of a station disseminating angular information in accordance with a frequency reference scheme. There is seen in this figure dwell gate information arriving from a detector such as detector 20 of FIG. 2 and the angle sub-carrier information arriving from a detector such as detector 22 of FIG. 2. The dwell gate information is supplied to arm a precision dwell gate logic circuit 96, that is to prepare circuit 96 to generate the leading edge of a precision dwell gate upon the occurrence of the first positive-going zero crossing of the angle sub-carrier after the leading edge of the dwell gate, and to turn off upon occurrence of the first negative-going angle sub-carrier after the trailing edge of the dwell gate. The precision dwell gate signal from circuit 96 is applied to qualify AND gate 100 to thus permit the zero crossings of the angle sub-carrier, or preferably the positive-going zero crossings of the angle sub-carrier, to be accumulated in a full cycle counter 102 during the period of the precision dwell gate. Thus, at the end of one cycle of operation the full cycle counter will contain a count related to the number of cycles of the sub-carrier occurring during the period of the precision dwell gate. The precision dwell gate signal is also applied to a time interval counter which is thereby qualified to accumulate clock pulses at a $f_1$ frequency during the period of the precision dwell gate. The time interval counter will thus at the end of one cycle of operation contain a count related to the period of the precision dwell gate. It is now merely necessary to divide the contents of counter 102 by the contents of counter 98 in a divider such as divider 109 to produce a signal correlated to the angular location of the receiver.

The invention claimed is:

1. Means for detecting the envelope of a radiated beam scanning through space at a receiver illuminated by the beam wherein the receiver includes circuits for producing the envelope of said beam, comprising:
   means for generating a signal at a signal level related to a predetermined point on said envelope and comprising a peak detector for detecting the peak level of said envelope and summing means decreasing the detected peak level by a predetermined amount to generate said signal level;
   analog means for delaying said envelope a predetermined time; and,
   means for thresholding the delayed envelope in accordance with said signal level.

2. The means for detecting of claim 1 wherein said radiated beam includes a sub-carrier whose frequency varies in relation to the departure of the beam from a predetermined line or plane in space, and wherein said receiver includes means for demodulating the sub-carrier, said means for detecting additionally comprising second means for delaying the demodulated sub-carrier by the same time as said analog means delays said envelope.

3. The means for detecting of claim 2 wherein said second means for delaying comprises: means for detecting the zero crossings of said demodulated sub-carrier; and, means for delaying the detected zero crossings by the same predetermined time as said envelope is delayed.

4. Means for detecting as recited in claim 3 wherein said beam is radiated from a fixed station and scanned from a predetermined position at a constant angular speed to a second predetermined position in one cycle so as to illuminate said receiver once in each cycle, and wherein said means for thresholding comprises:
   means for generating a threshold signal in response to said signal level and displaced a predetermined amount therefrom;
   means responsive to said threshold signal for generating a first gate signal during the time said envelope exceeds said threshold signal;
   means for generating a precision gate signal extending from the occurrence of the first zero crossing in a predetermined direction after the beginning of said first gate signal and extending to the occurrence of the first zero crossing in a predetermined direction after the end of said first gate signal;

means for determining the duration of said percision gate signal;

means for counting the number of zero crossings occurring during the duration of said precision gate signal; and, means for dividing the number counted by said means for counting by the duration determined by said means for determining.

5. Means for detecting the envelope of a radiated beam scanning through space at a receiver illuminated by the beam wherein the receiver includes circuits for producing the envelope of said beam and wherein said beam is radiated from a fixed station and scanned in one cycle from a predetermined position at a constant angular speed to a second predetermined position and return so that said receiver is illuminated twice by said beam during one cycle, comprising:

means for generating a signal at a signal level related to a predetermined point on said envelope;

analog means for delaying said envelope a predetermined time;

means for generating a threshold signal in response to said signal level and displaced a predetermined amount therefrom;

means responsive to said threshold signal for generating a gate signal during the time said envelope exceeds said threshold signal; and, timing means operative at a first speed during the period of each gate signal and operative at a second speed during the period extending from the end of a first gate signal to the beginning of a subsequent gate signal.

* * * * *